United States Patent
Romero Araguete et al.

(10) Patent No.: US 11,647,702 B2
(45) Date of Patent: *May 16, 2023

(54) PROTECTOR DEVICE COMPRISING A PLURALITY OF PAIRS OF MULTI-PRONGED ELEMENTS

(71) Applicants: Manuel Romero Araguete, Torre de Miguel Sesmero (ES); Francisco Romero Araguete, Torre de Miguel Sesmero (ES)

(72) Inventors: Manuel Romero Araguete, Torre de Miguel Sesmero (ES); Francisco Romero Araguete, Torre de Miguel Sesmero (ES)

( * ) Notice: Subject to any disclaimer, the term of this patent is extended or adjusted under 35 U.S.C. 154(b) by 278 days.

This patent is subject to a terminal disclaimer.

(21) Appl. No.: 17/093,059

(22) Filed: Nov. 9, 2020

(65) Prior Publication Data
US 2021/0051863 A1    Feb. 25, 2021

Related U.S. Application Data

(63) Continuation-in-part of application No. 15/108,471, filed as application No. PCT/ES2015/070022 on Jan. 16, 2015, now Pat. No. 10,849,282.

(30) Foreign Application Priority Data

Jan. 20, 2014    (ES) .............................. ESP201400071

(51) Int. Cl.
*A01G 13/00*    (2006.01)
*A01G 13/10*    (2006.01)
(Continued)

(52) U.S. Cl.
CPC ............ *A01G 13/10* (2013.01); *A01K 13/004* (2013.01); *A01K 39/00* (2013.01); *A01K 47/06* (2013.01);
(Continued)

(58) Field of Classification Search
CPC .... A01G 13/00; A01G 13/02; A01G 13/0225; A01G 13/0237; A01G 13/0243;
(Continued)

(56) References Cited

U.S. PATENT DOCUMENTS

| 334,807 A | 1/1886 | Reese |
| 414,175 A | 10/1889 | Whittaker |

(Continued)

FOREIGN PATENT DOCUMENTS

| CA | 2150726 A1 | 12/1995 |
| ES | 1061517 U | 3/2006 |

(Continued)

OTHER PUBLICATIONS

International Search Report dated Feb. 20, 2015 for PCT/ES2015/070022 and English translation.

*Primary Examiner* — Monica L Perry
*Assistant Examiner* — Michael A. Fabula
(74) *Attorney, Agent, or Firm* — Lucas & Mercanti, LLP

(57) ABSTRACT

A protector device includes a plurality of pairs of multi-pronged elements. Each pair of multi-pronged elements includes a first multi-pronged element having a first C-shaped element that has a first straight section, a first end forming a first end spike, and a second end forming a second end spike, and a first connecting element attached to and perpendicular to the first C-shaped element. Each pair of multi-pronged elements also includes a second multi-pronged element including a second C-shaped element connected to the first connecting element of the first multi-pronged element, the second C-shape element having a second straight section, a third end forming a third end spike, and a fourth end forming a fourth end spike, and a second connecting element attached to and perpendicular to the second C-shaped element.

15 Claims, 12 Drawing Sheets

(51) Int. Cl.
*A01K 61/70* (2017.01)
*A01K 13/00* (2006.01)
*A01K 39/00* (2006.01)
*A01K 47/06* (2006.01)
*A01M 29/32* (2011.01)
*A01K 61/10* (2017.01)

(52) U.S. Cl.
CPC ............. *A01K 61/70* (2017.01); *A01M 29/32* (2013.01); *A01K 61/10* (2017.01)

(58) Field of Classification Search
CPC ............. A01G 13/10; A01G 2013/006; A01K 1/0035; A01K 1/0041; A01K 3/00; A01K 2003/007; E04H 17/00; E04H 17/02; E04H 17/04; E04H 17/14; E04H 17/16; E04H 17/161; E04H 17/18
See application file for complete search history.

(56) References Cited

U.S. PATENT DOCUMENTS

| | | | |
|---|---|---|---|
| 503,948 A | 8/1893 | Crews | |
| 557,905 A | 4/1896 | Smith | |
| 572,133 A | 12/1896 | Stephens | |
| 600,645 A | 3/1898 | Jessup et al. | |
| 624,045 A | 5/1899 | Jennings et al. | |
| 700,820 A | 5/1902 | Ralston | |
| 1,512,618 A | 10/1924 | McDonald | |
| 1,521,240 A * | 12/1924 | Graham | E04H 17/18 256/25 |
| 1,901,700 A | 3/1933 | Carpenter | |
| 2,009,867 A | 7/1935 | Ball | |
| 2,056,136 A | 9/1936 | Hyatt | |
| 2,142,371 A | 2/1939 | Peles | |
| 2,996,842 A | 8/1961 | Weston | |
| 3,604,685 A | 9/1971 | Pokryfki | |
| 4,040,603 A | 8/1977 | Mainiero | |
| 4,110,943 A | 9/1978 | Carlson | |
| 4,250,664 A | 2/1981 | Remke | |
| 4,403,447 A | 9/1983 | Braun | |
| 4,616,753 A | 10/1986 | Aslan | |
| 4,858,380 A | 8/1989 | Gayle | |
| 5,174,060 A | 12/1992 | Glamos | |
| 5,310,163 A | 5/1994 | Waite | |
| 5,528,858 A | 6/1996 | Omdahl | |
| 5,596,834 A | 1/1997 | Ritter | |
| 5,782,041 A | 7/1998 | Filipescu | |
| 5,992,828 A | 11/1999 | Burdick | |
| 6,226,933 B1 | 5/2001 | Nelson et al. | |
| 6,289,639 B1 | 9/2001 | Robertson | |
| 7,308,868 B1 | 12/2007 | Borg | |
| 8,640,398 B1 | 2/2014 | Richmond | |
| 9,398,746 B1 | 7/2016 | Schweitzer | |
| 10,849,282 B2 * | 12/2020 | Romero Araguete | A01K 47/06 |
| 2004/0040225 A1 | 3/2004 | Finkelstein | |
| 2004/0216393 A1 | 11/2004 | Hall et al. | |
| 2006/0150478 A1 | 7/2006 | Gfesser | |
| 2007/0062108 A1 | 3/2007 | Wilbank, Jr. et al. | |
| 2007/0271859 A1 | 11/2007 | Scheirs | |
| 2010/0155553 A1 | 6/2010 | Langley et al. | |
| 2011/0155676 A1 | 6/2011 | Kozak et al. | |
| 2011/0247266 A1 | 10/2011 | McMichael | |
| 2013/0219768 A1 | 8/2013 | Hand | |
| 2014/0083002 A1 | 3/2014 | McMichael | |
| 2014/0259901 A1 | 9/2014 | Williams | |
| 2015/0289454 A1 | 10/2015 | Legus et al. | |
| 2015/0337558 A1 | 11/2015 | Shepherd | |
| 2018/0255715 A1 * | 9/2018 | Demel | A01G 13/0243 |
| 2021/0051863 A1 * | 2/2021 | Romero Araguete | A01K 61/70 |

FOREIGN PATENT DOCUMENTS

| | | |
|---|---|---|
| ES | 2249947 A1 | 4/2006 |
| ES | 2402972 A1 | 5/2013 |
| FR | 2483170 A1 | 12/1981 |
| GB | 191113653 A | 2/1912 |
| WO | 95/31099 A1 | 11/1995 |
| WO | 02/19819 A2 | 3/2002 |

* cited by examiner

PROTECTOR DEVICE COMPRISING A PLURALITY OF PAIRS OF MULTI-PRONGED ELEMENTS

CROSS-REFERENCE TO RELATED APPLICATION

This application is a Continuation in Part of U.S. application Ser. No. 15/108,471, filed on Jun. 27, 2016, which in turn is a 371 of PCT/ES2015/070022 filed Jan. 16, 2015, which claims the benefit of Spanish Patent Application No. P201400071, filed Jan. 20, 2014; the contents of each of which are incorporated herein by reference.

FIELD OF THE INVENTION

The present invention relates to an object-system that has been specially designed to solve multiple important problems in different sectors. These include forests, rangelands and other agro/silvo/pastoral ecosystems, pisciculture systems on one side and other problems related to traffic safety on highways, as well as other constructed areas and living quarters and support for creeper plants, whether ornamental or food production and other substances. It also successfully aids in protection for nests, animal shelters and relevant objects, including bee hives.

BACKGROUND OF THE INVENTION

As is known, the lack of natural regeneration of forests and savannah type systems around the planet is leading to an unstoppable deforestation of these ecosystems. As herbivorous livestock and wild animals consume and scratch vigorously on young budding seedlings, they prevent its regeneration and destroy them without remedy, even when many species of trees, such as oak, are particularly thorny in its early stages of life.

On the other hand, many of these agro/silvo/pastoral and pisciculture farming systems, which contain several bodies of water created by rainfall, have multiple roles including environmental, and especially livestock watering, but also the breeding and sale of fish species of high nutritional and culinary value. For example, in Extremadura (Spain), a valued cyprinid is grown called tench (tinca tinca), whose population is attacked mercilessly by various predators, and humans who poach these fish with nets in ponds and bodies of water. These actions decimate the tench and other species such as crustaceans and amphibians that inhabit the water after many years of aquaculture investment.

Another recurring concern on roads around the world with circulating motor vehicles, locomotives, airplanes and others, is the invasion of both domestic and wild animals. The wild boar is a specific case that has caused many accidents and is capable of penetrating the protective road barriers. In some cases wild boars root beneath to lift and distort the protections and access the road. The unintended consequences may include accidents and cost human lives.

There is also an important issue regarding effective protection of bird nests, which suffer from predators pushing up or scraping on the clumps of trees and other plants, and in doing so, destroy the established nests in these bushes or plants. A similar problem is the attack on beehives by humans or bears and other animals. Similarly, many small animals like field mice and dormice who bury seeds in the ground as storage, where they forget many of them, subsequently germinating and renewing the forest and rangelands, are victims of predators such as pigs, and thus regeneration of forests and rangelands is not promoted. Even in the case that seedlings do break out, livestock tramples the plants easily.

Furthermore, a solution is needed where ornamental creepers and production plants can adhere to smoothly, albeit on one side of said structure. Once it becomes necessary to remove the plants, simply remove the structure-system quickly and easily, in our case the protector device comprising a plurality of pairs of multi-pronged elements.

To solve these technical problems and many others, it was necessary to create a device that can solve all of them at once. Therefore, the protector device comprising a plurality of pairs of multi-pronged elements was invented as a "cactus-like" object, or spiky metallic bush in industrial design. This design is based on the science of biomimetics—to mimic the workings of the natural world and apply them to industrial design—in this case the idea of the cactus.

The object of the invention is based on incorporating unique innovations, making it capable of protecting plants and trees and allowing animals to scratch themselves, protect fish and other animals from predators in all kinds of aquatic and terrestrial surfaces, even insects (honeybees). The invention has further applications related to traffic or private property and also serves as a support for creeper plants and encourages natural regeneration of forests and rangelands. All of the above is achieved with the extraordinary and unique features that will be described below.

Regarding its protective function for trees and plants and a scratcher for animals, we specify that the multi-pronged elements that form this new invention are multidimensional, that is, every spike of our invention can be part of different multi-pronged elements at the same time in different areas of the object surface, varying, depending on its position, as will be shown later in the case of the preferred model. It also incorporates other unique innovations, such as the structure of the entire protector device comprising a plurality of pairs of multi-pronged elements formed by the union of the same multi-pronged elements, which in turn becomes an impenetrable structure and highly deterrent for any animal or other living thing, as well as being safer and having fakir effect in case of an accidental hit against the object, and further optimize the material used. Another unique feature is that this invention does not require ground support, rods, nets or even height adjustment since it can stand upright on its own or you can even bury part of the object in the ground. You can also add other modules onto the initial installed. Small tie wire or rods can also be attached to add stability and raise the protector higher when necessary as the plant or tree grows. Another unique innovation of this invention is that animals can scratch and deworm themselves, both domestic and wild, especially cattle, horses, goats and other animals with hair, but only up to a certain point. Scratching must be soft so as to not affect the general structure or suffer alteration nor deteriorate any plant, tree or bush that is being protected. The effect is similar to a human anti lice comb. If we pass the comb, it picks up parasites and slightly stimulates the scalp, but if vigorously pressed against the scalp, it produces lacerations in the scalp skin. Since the damage by animal scratching, especially cattle, in seedlings or clumps of young trees is a way of deworming and keeping their coat in healthy and hygienic conditions, this invention is not only able to effectively and efficiently protect the seedling, but simultaneously allows the preening and deworming for animals without deformation or alteration, while protecting the bushes and nearby seedlings. As animals learn to scratch gentler against the invention, they can become accustom to scratching less fiercely and do the same on unprotected tree trunks.

Further evidence and exclusive advantages of this invention is that it protects trees and plants from both large animals, such as cattle or bears, and small animals like rabbits and rats at the same time and allows the passage and shelter for animals known for contributing to natural forest regeneration like field mice and dormice that bury acorns or other seeds that can germinate, promoting natural forestry regeneration. Also, the invention can be installed during any season, even over plants that are not pruned, or on the tree whip, seedling or shrubs being protected. Our invention can also be reused throughout the years, moving the protector from trees that are no longer in danger since the bottom of the tree that has been developed and strengthened, and install it on another seedling. Protectors can be manufactured in any size, width and height, and animal receive access to areas of the plant not needing protection for natural pruning/feeding for the tree and scratching for the animal, making animals "pruner-maintainers" of the protected plant. They can be installed on the same shrub or seedling without fastening down as a shell over the foliage. It also has the distinction of being able to prune without having to touch the object or objects that are protecting a young plant, bush or tree. When they are supported on the floor covering a seedling, the tree can be pruned at the top, up to 4 feet high. In the case of shorter protectors, 20 centimeters high, where they often combine more than one of them and leave a space between them unprotected (since that unprotected area is too small for the animal anyway) so you can pruned above, below or in between these protectors with these sizes, all without having to manipulate or uninstall them for that task.

Another innovative aspect is the possibility of creating the width desired by joining more than one protector from the side, yielding any shape needed. Therefore, the protection versatility and ease of installation and reuse of the protector device comprising a plurality of pairs of multi-pronged elements is far superior to any other system, such as protective standard welded wire cages. Since our invention cannot be pushed over, trampled, or scraped vigorously, the durability is extraordinary. As already indicated, the spikes comprise the multiple or multi-dimensional multi-pronged elements at the same time, which, in case of accidental violent contact against the invention, prevents animals or persons from severe damage because of the aforementioned "fakir effect" that would prevent eye damage, since the spikes would pinch first on many points on the face of a human before making contact with the eye. Humans have eyes sunken into the face precisely to avoid injury with sharp objects. Therefore, the protector device comprising a plurality of pairs of multi-pronged elements, object of this invention, provides excellent security and animal welfare. It is the only device of such protective capacity that can be installed in bushes, trees and unpruned seedlings and during any season. Another unique feature is the ability to protect small seedlings, newly planted bushes or trees in small versions or modules from the ground up. Later, as the plant grows, you can add other protector devices or modules on top of the previously installed, and thus protecting on a need basis, optimizing the time, labor and space, since all trees do not grow at the same pace. You also have the option to swap modules between different trees that are protected but they need a system of mutual aid during any season.

As for its role in protecting fish, amphibians and crustaceans in inland bodies of water (ponds or other), that are attacked by predators, mainly birds and mammals, as well as human poaching by illegal crossing of fishing nets through these waters indiscriminately capturing all these animals that dwell in these aquatic spaces, the protector has fully demonstrated its effectiveness in this area during our testing period. The most common form of protection is to curve the protector into a cylindrical shape, forming a kind of worm, and sinking it horizontally on the bottom of the pond and joining them by any means, leaving a space between them, to further sink said "worm" in the pond or other body of water. The location of these would be known by the owner and obviously by the species living in this space and be protected. It has been found that these beings become familiarized with the protector device, taking refuge in them to attack by predators because, small fish, amphibians and crustaceans can access the inside of the protector even through the space between the spikes. Larger fish can take refuge through one of the two open ends, both for the case of a protector or a set of them if it conforms a "worm" and reasonably spaces to enter at the union of both in cases of forming the indicated "worms", giving fish fast access to shelter. It has been noted in field trials, that predators such as cormorants, who cannot swim faster horizontally than the fish inside the protector, remarkably reduces their catch rate by human to almost 0%. This can be altered by reducing the diameter of the protectors, so they can swim and hide all kinds of animals, such as the aforementioned fish, amphibians and crustaceans, but preventing access of larger animals such as cormorants, water voles and otters, simply because they cannot fit through the openings of the protector. Human poaching usually take place at night when stealthy fishermen are combing the pond, lake or body of water with nets to corral fish and surprise occurs when the nets are hooked on the protector's spikes anchored at the bottom of the water, making it impossible to continue with the task, and eventually abandoned, often with the loss of the netting from entanglement in our spikes. All during which the fish in the water can reach refuge faster in our protector than the movement of manually handled netting from poachers. Another unique feature is that the spikes of the protector on the floor of the pond or body of water form an anchor on said floor by the penetration of the spikes into the mud bed.

Regarding the protection function for vehicles and accidents that occur worldwide on roads, highways, expressways, roads, trains, airports and centers of circulation are common when wild and domestic animals or people, access the road who should not be allowed entry. The most stubborn and better equipped animal to access roads are undoubtedly the Wild Boar (*Sus scrofa*), an animal endowed with a powerful nose and snout capable of undermining all kinds of fences, digging and rooting under these hedges, lifting and then deforming them to continue their way. For these cases, the protector device comprising a plurality of pairs of multi-pronged elements has proven a formidable opponent by attaching to the outside of the enclosure or fence by any means such as tie wire, and in the case of feral pigs, bury part of the protector into the earth. The Wild Boar quickly checks the effectiveness of the protector, first palpating gently with his nose the portion protruding above ground, so the spikes quickly deter his attempt to deform the fence. When the animal attempts to root the earth or deform from below, with surprise, the animal finds the same impenetrable spiky structure, so they give up the attempt. Since the damage from a major push against the protective object can be considerable, animals give up quickly. It is also true for police checks on asphalt roads.

The protector device comprising a plurality of pairs of multi-pronged elements also has excellent features for the protection of other spaces and properties that can be assaulted by animals or humans, like protection in homes, ranches, houses, warehouses, garages, public places, sports centers, fencing and fences of all kinds. Since you can easily install our invention by itself or attach to existing fences and enclosures, it results in an easy and major increase in deterrent effect, while preventing the entanglement in the spikes of people or animals that hit accidentally or consciously (in human case). The invention also deters predators from scaling up such protection, and if they do makes it very painful and delays the action. The protector can also be used in cages for diving with sharks and other predators, or doghouses or coating of these houses to protect from predators. Another application is its function to wrap around ornamental and productive creepers; The protector device comprising a plurality of pairs of multi-pronged elements makes up an extraordinary and strong structure, which can be elevated, and sustains all kinds of heavy orchards over a long period of time. This can be used on indoor walls and when used outside, can serve as protection.

The protector device comprising a plurality of pairs of multi-pronged elements is also very useful in protecting shelters and homes of various animals and insects, as it protects the hives and their dwellers, bees, from bear attacks or other animals. It is also able to protect and provide support for bird nests, and birds can make seedlings, shrubs or trees of small height where domestic and wild animals scratch and consume their leaves. These animals would normally destroy said nests in addition to the birds. The spikes also serve to impale insects that serve as food for the birds. The tree protector defends the nests, provides shelter for birds and in exchange these birds consume ticks and other parasites maintaining better health and welfare of the trees as well. The protector device comprising a plurality of pairs of multi-pronged elements also serves to protect and build all kinds of refuge for other animals, hares, rabbits, partridges, etc.

The invention therefore covers various technical fields, such as reforestation and regeneration of forests and pastures and all kinds of agro/silvo/pastoral spaces compatible with grazing using individual protection, technical aquaculture and protection of aquatics, terrestrial beings and insects, and the dwellings and homes of trees and animals, as well as technical security sectors in all types of roads and transportation, and security of other private and public, human and animal properties—Also in the field of gardening and cultivation of orchards in general.

The protector device comprising a plurality of pairs of multi-pronged elements effectively protects the standard welded wire cages or other types of individual protective for trees, plants, buildings, houses, or objects as they can be installed in entire bodies or strips (also called "crown-belts") on these objects avoiding pushing, scratching and assault on guards or said protected objects.

BRIEF DESCRIPTION OF THE DRAWINGS

Further features, advantages and objects of the present invention will become apparent for a skilled person when reading the following detailed description of non-limiting embodiments of the present invention, when taken in conjunction with the appended drawings, in which.

BACKGROUND OF THE INVENTION

Figure 1:
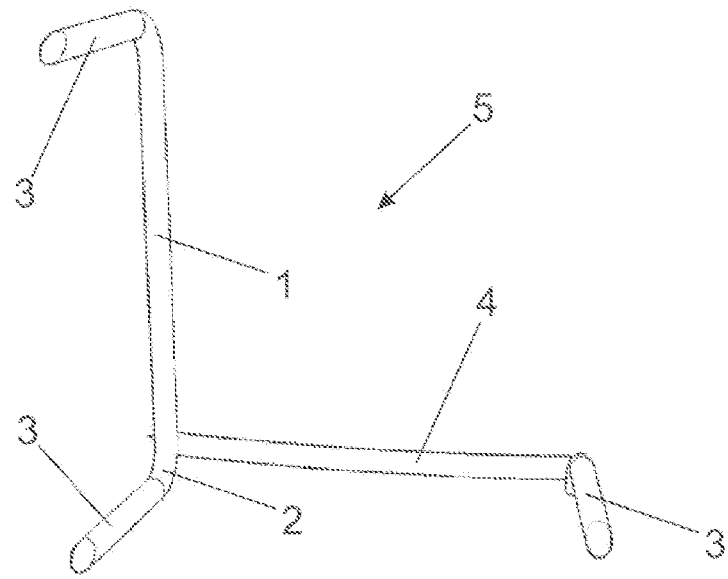
FIG. 1 shows a detailed view of a multi-pronged element according to the invention.

Until now, the existence of the protector device comprising a plurality of pairs of multi-pronged elements has been unknown, and even less so an invention comprised entirely of the L-shaped prongs or spikes attached to each other expanding by height and width to any dimension necessary, even with this wide variety of above applications.

Also, until this invention, there were no object-systems that did not need supplemental accessories or materials requiring extra work for the installation process. The protector device comprising a plurality of pairs of multi-pronged elements is characterized by spikes placed in any position on a horizontal plane, hence its unique multi-trident or multidimensional form, gives it an extraordinary deterrent/dissuasion capability and extreme resistance and strength throughout the entire object, having no weak point in any of the points in all dimensional space. Another unique and innovative feature that no previous protectors have is that the protector device comprising a plurality of pairs of multi-pronged elements is created by the connection of C-shaped elements that compose it and does not have any extra structure on which this grips to, but binds to each other in a system of mutual aid forming the whole dimension of the object, hence its extraordinary strength, resistance, and deterrent capacity. No tree protection system exists that allows animals to lightly scratch for deworming and grooming without deformation of the tree protector and prevents them from scratching vigorously or penetrates the system to access the plant or tree. Also, no tree protection system exists that can be installed on unpruned bushes or plants, and during any time of year. Nor exists a protector that protects animals and their nests or offspring, as well as insects such as bees and their hives. Nor exists protectors that serve as a refuge for fish, amphibians and crustaceans in the aquatic environment against predators and human poaching. Nor exists a protector that serves as support for plants, especially vines, whether ornamental or food-productive. Similarly, the existence of protectors that can be combined with each as modules built from the floor base by placing some on top of others, and recombine at will as needed, without using supporting materials or lifts that withstand vigorous pushing. It is also unknown the existence of protectors to defend property and human dwellings and roads and spaces of vehicles deterring animals who want to access them and can cause accidents. No protectors are known that can protect small seedlings, shrubs and newly planted trees in modules from the ground, later as the plant grows can add other protective or modules on the previously installed, and thus protect as needed basis, optimizing the time, labor and space, since all trees do not grow at the same pace, and can swap modules (other protectors) between different trees that are protected as needed in a system of mutual aid during any season.

SUMMARY OF THE INVENTION

The protector device comprising a plurality of pairs of multi-pronged elements, is an object-system that satisfactorily solves the aforementioned problems. The protector device is formed from the union of a plurality of pairs of multi-pronged elements creating a multi-dimensional structure with spikes or thorns. The spikes may be of any thickness, length and geometric shape also may be of any material such as plastic, metal, glass, carbon fiber, wood, combining them or any other. Also various types of multi-pronged elements, or any other geometric configuration that conform dimensional spikes, may be of any material such as plastic, metal, glass, carbon fiber, wood, combinations thereof, or any other. The union of the elements that make up the various types of multi-pronged elements that configure the spikes may be made by any means, such as heat, laser welding, electric welding, fastening wires, adhesives and resins, or any other means that would connect them. They may also be manufactured in a single body (all elements simultaneously) by injection molding, extrusion of any materials, casting, even by 3D printers. They can also be manufactured in successive steps starting from preforms of any type of materials and their combinations that serve as raw materials, through twists, cuts, pressures and bends conforming the spikes, various kinds of multi-pronged elements or other geometric shapes that form the spikes and the union of the above structures to finally form the protector device comprising a plurality of pairs of multi-pronged elements. The invention may eventually form any geometric structure and any height and width, plus its malleability may be rigid, soft or semi-rigid, depending on what you want to achieve in each case, which can allow for easy shaping. The spikes are preferably projected to the outside of the area to be protected, but also may be facing the interior of the area.

Although preferentially horizontal, the spikes may be arranged in any directional vector from the horizontal line of the protector device. Spikes and various kinds of multi-pronged elements or other geometric forms of grouping of spikes may be made with the twists and molds, at any point in its structure, which seek greater strength and robustness in the spikes. The various kinds of multi-pronged elements or other geometric shapes that form the final structure of the invention allow scratching and grooming animal hair without deforming the object. The spikes may be spaced from each other at any distance, so various kinds of multi-pronged elements or geometric structures forming the group of spikes may be of any size, height and width.

The invention may be helped by any type of small anchors if placed on the ground or soil, which may be of any material, length and geometry, even for raising the height when necessary, the invention can also be attached to these anchors or staples by any means, such as welding, electric welding, wired, stuck with any kind of glues and resins, laser or other, even by the spikes born in the invention itself.

The preferred embodiment of the invention, as will be described later, is formed by successive union of spikes that make various kinds of multi-pronged elements. Each multi-pronged element comprises:

a C-shaped element having a first straight section, a first end bent to form a first elbow and a first end spike, and a second end bent to form a second elbow and a second end spike, the first end spike projecting perpendicular to the first straight section, the second end spike projecting perpendicular to the first straight section, wherein the first straight section, the first end spike, and the second end spike form a C-shape; and a connecting element attached to the first C-shaped element, the first connecting element being perpendicular to the first straight section, wherein the first straight section and the first connecting element form an L-shape.

A first multi-pronged element is connected to a second multi-pronged element to form a pair of multi-pronged elements, and a plurality of pairs of multi-pronged elements are connected to each other to form the protector device.

As already stated, multi-pronged elements may be of any size, height and width. In one exemplary embodiment, the multi-pronged element consists of a wire 10 cm long and 2.8 mm thick and composed of a combination of metal and plastic, which is modeled forming C-shape, where the final two spikes are 2.5 cm, the torsion zone form two angles of 90°. Subsequently another wire of same characteristics as the previous, but 7.5 cm long is modeled, and L-shaped, also with a 90° twist to conform a 2.5 cm spike at the end. This spike forms part of the initial L-shaped prong and at the same time forms part of the next (second) multi-pronged element. Subsequently both spikes are joined with a configuration of the vertical C-shaped spike, and the spike in fallen L-shaped and connected at the top to the bottom of the C-shaped spike part. The three spiked ends are facing the same direction. These multi-pronged elements of varying characteristics attached to each other, by any means, form the protector device. This union of various multi-pronged elements at the same time can be understood as multi-dimensional, and creating an extraordinary structure, which when curved into a cylindrical shape is more rigid and compact. Assembling spikes on top of others in the preferred embodiment yields a more sturdy structure and can resist an accidental blow and/or vigorous scratching from animals.

The spikes with a 90° elbow fold that form the final spike is much more resistant to accidental pushing and scratching from animals for grooming/deworming and can ensnare better, with no easy exit, a poachers netting. The invention can also be manufactured in one body by casting or injection of various types of molds materials or a combination, or a stamped preform and timely models. The various types of multi-pronged elements can also be formed simultaneously by cutting and folding the final spikes into position, later to bend it and shape it in its preferred cylindrical model as mentioned.

In embodiment 1, a protector device has:
a plurality of pairs of multi-pronged elements, each pair of multi-pronged elements comprising:
   a first multi-pronged element comprising:
      a first C-shaped element having a first straight section, a first end bent to form a first elbow and a first end spike, and a second end bent to form a second elbow and a second end spike, the first end spike projecting perpendicular to the first straight section, the second end spike projecting perpendicular to the first straight section, wherein the first straight section, the first end spike, and the second end spike form a C-shape; and
      a first connecting element attached to the first C-shaped element, the first connecting element being perpendicular to the first straight section, wherein the first straight section and the first connecting element form an L-shape; and
   a second multi-pronged element attached to the first connecting element and not attached to the first C-shaped element, the second multi-pronged element comprising:
      a second C-shaped element connected to the first connecting element of the first multi-pronged element, the second C-shape element having a second straight section, a third end bent to form a third elbow and a third end spike, and a fourth end bent to form a fourth elbow and a fourth end spike, the third end spike projecting perpendicular to the second straight section, the fourth end spike projecting perpendicular to the second straight section, wherein the second straight section, the third end spike, and the fourth end spike form a C-shape; and
      a second connecting element attached to the second C-shaped element and not attached to the first C-shaped element, the second connecting element being perpendicular to the second straight section, wherein the second straight section and the second connecting element form an L-shape;
wherein the protector device has a prismatic shape with a polygonal base.

In the protector device according to embodiment 1, each pair of multi-pronged elements can have:
the first C-shaped element and the first connecting element are joined by one of heat, laser welding, electric welding, fastening of wires, adhesives and resins; and
the second C-shaped element and the second connecting element are joined by one of heat, laser welding, electric welding, fastening of wires, adhesives and resins.

In the protector device according to embodiment 1, the first and second end spikes can have a selected level of sharpness.

In the protector device according to embodiment 1, a distance between the first end spike and the third end spike can be less than 10 cm.

In the protector device according to embodiment 1, the protector device can be disposed around one of plants, bushes, trees, objects and surfaces, without any clamping or tying. The protector device can be connected to a second protector device.

In embodiment 2, a protector device has:
a plurality of pairs of multi-pronged elements, each pair of multi-pronged elements comprising:
   a first multi-pronged element comprising:
      a first C-shaped element having a first straight section, a first end bent to form a first elbow and a first end spike, and a second end bent to form a second elbow and a second end spike, the first end spike projecting perpendicular to the first straight section, the second end spike projecting perpendicular to the first straight section, wherein the first straight section, the first end spike, and the second end spike form a C-shape; and
      a first connecting element attached to the first C-shaped element, the first connecting element being perpendicular to the first straight section, wherein the first straight section and the first connecting element form an L-shape; and
   a second multi-pronged element attached to the first connecting element and not attached to the first C-shaped element, the second multi-pronged element comprising:
      a second C-shaped element connected to the first connecting element of the first multi-pronged element, the second C-shape element having a second straight section, a third end bent to form a third elbow and a third end spike, and a fourth end bent to form a fourth elbow and a fourth end spike, the third end spike projecting perpendicular to the second straight section, the fourth end spike projecting perpendicular to the second straight section, wherein the second straight section, the third end spike, and the fourth end spike form a C-shape; and
      a second connecting element attached to the second C-shaped element and not attached to the first C-shaped element, the second connecting element being perpendicular to the second straight section, wherein the second straight section and the second connecting element form an L-shape;
wherein the protector device has a prismatic shape with a polygonal base and is disposed on a surface of a ground, is secured to the ground with one or more anchors consisting of metal rods extending to the surface and attached to the protector device.

In embodiment 3, a protector device has:
a plurality of pairs of multi-pronged elements, each pair of multi-pronged elements comprising:
   a first multi-pronged element comprising:
      a first C-shaped element having a first straight section, a first end bent to form a first elbow and a first end spike, and a second end bent to form a second elbow and a second end spike, the first end spike projecting perpendicular to the first straight section, the second end spike projecting perpendicular to the first straight section, wherein the first straight section, the first end spike, and the second end spike form a C-shape; and a first connecting element attached to the first C-shaped element, the first connecting element being perpendicular to the first straight section, wherein the first straight section and the first connecting element form an L-shape; and a second multi-pronged element attached to the first connecting element and not attached to the first C-shaped element, the second multi-pronged element comprising:

a second C-shaped element connected to the first connecting element of the first multi-pronged element, the second C-shape element having a second straight section, a third end bent to form a third elbow and a third end spike, and a fourth end bent to form a fourth elbow and a fourth end spike, the third end spike projecting perpendicular to the second straight section, the fourth end spike projecting perpendicular to the second straight section, wherein the second straight section, the third end spike, and the fourth end spike form a C-shape; and a second connecting element attached to the second C-shaped element and not attached to the first C-shaped element, the second connecting element being perpendicular to the second straight section, wherein the second straight section and the second connecting element form an L-shape;

wherein the protector device has a prismatic shape with a polygonal base.

The protector devices discussed above can also be of a geometrical shape such as oval, triangle, square, rectangle, rhombus, trapezoid, pentagon, hexagon, octagon, cylinder, prism, cube, cone, tetrahedron, hexagonal prism, pentagonal prism.

In embodiment 4, a protector device has:

a plurality of circular wire elements arranged about an axis, the plurality of circular wire elements having a selected radius, each circular wire element being separated from an adjacent circular wire element by a selected distance; and a plurality of C-shaped elements, each C-shaped element having:
a straight section;
a first end bent to form a first elbow and a first end spike; and
a second end bent to form a second elbow and a second end spike, wherein the first end spike is perpendicular to the straight section, and the second end spike is perpendicular to the straight section;

wherein each C-shaped element is attached to a first circular wire element of the plurality of circular wire elements and to a second circular wire element of the plurality of circular wire elements, wherein the first end spike and the second end spike project radially away from the axis.

In the protector device in accordance with embodiment 2, each pair of multi-pronged elements there is:

the first C-shaped element and the first connecting element are joined by one of heat, laser welding, electric welding, fastening of wires, adhesives and resins; and the second C-shaped element and the second connecting element are joined by one of heat, laser welding, electric welding, fastening of wires, adhesives and resins.

In the protector device according to embodiment 2, the first and second end spikes can have a selected level of sharpness.

In the protector device according to embodiment 2, a distance between the first end spike and the third end spike can be less than 10 cm.

In the protector device according to embodiment 2, the protector device can be disposed around one of plants, bushes, trees, objects and surfaces, without any clamping or tying.

In the protector device according to embodiment 2, the protector device can be connected to a second protector device. In the protector device, in each pair of multi-pronged elements, can also have:

the first C-shaped element and the first connecting element are joined by one of heat, laser welding, electric welding, fastening of wires, adhesives and resins; and the second C-shaped element and the second connecting element are joined by one of heat, laser welding, electric welding, fastening of wires, adhesives and resins.

In the protector device according to embodiment 3, the first and second end spikes can have a selected level of sharpness.

In the protector device according to embodiment 3, a distance between the first end spike and the third end spike can be less than 10 cm.

In the protector device according to embodiment 3, the protector device can be disposed around one of plants, bushes, trees, objects and surfaces, without any clamping or tying. The protector device can also be connected to a second protector device.

DETAILED DESCRIPTION OF EXEMPLARY EMBODIMENTS

FIG. 1 shows a detailed view of a multi-pronged element (5) according to the invention. This element comprises a C-shaped element having a first straight section (1), a first end bent to form a first elbow (2) and a first end spike (3), and a second end bent to form a second elbow and a second end spike (3), the first end spike (3) projecting perpendicular to the first straight section (1), the second end spike (3) projecting perpendicular to the first straight section (1). The first straight section, the first end spike, and the second end spike form a C-shape. A connecting element (4) is attached to the C-shaped element, the connecting element (4) being perpendicular to the first straight section (1) and the first straight section and the first connecting element form an L-shape. A third end spike (3) projects perpendicular to the connecting element (4).

Figure 2:
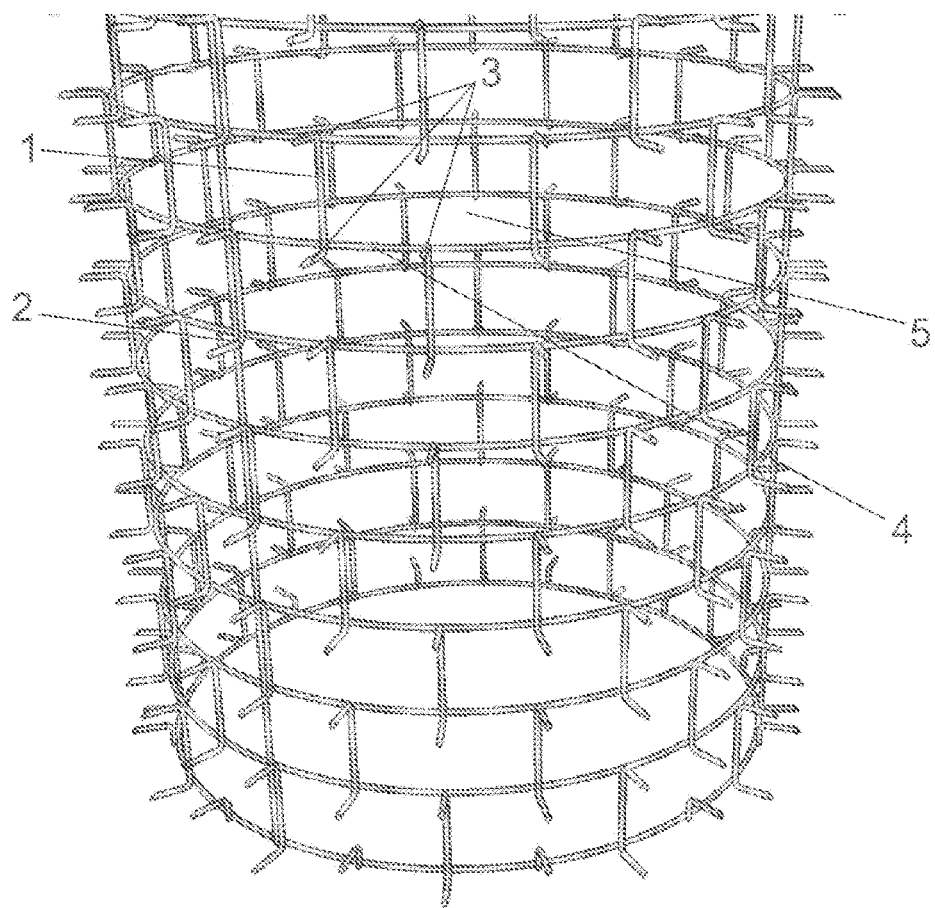
FIG. 2 shows a partial view of the combination of multi-pronged elements according to a first embodiment of the invention wherein the protector device has a shape of a cylinder.

FIG. 2 shows a partial view of the combination of multi-pronged elements according to a first embodiment of the invention wherein the protector device has a shape of a cylinder. The protector device shown, is formed by the union of a plurality of pairs of multi-pronged elements, each pair of multi-pronged elements. Each pair of multi-pronged element comprises a first multi-pronged element as described above (see FIG. 1) and a second multi-pronged element attached to the first connecting element and not attached to the first C-shaped element. The second multi-pronged element comprises a second C-shaped element connected to the first connecting element of the first multi-pronged element, the second C-shape element having a similar C-shape as described above for the first C-shape element; and a second connecting element attached to the second C-shaped element and not attached to the first C-shaped element. The second connecting element is perpendicular to the second straight section and the second straight section and the second connecting element form an L-shape.

Figure 12:
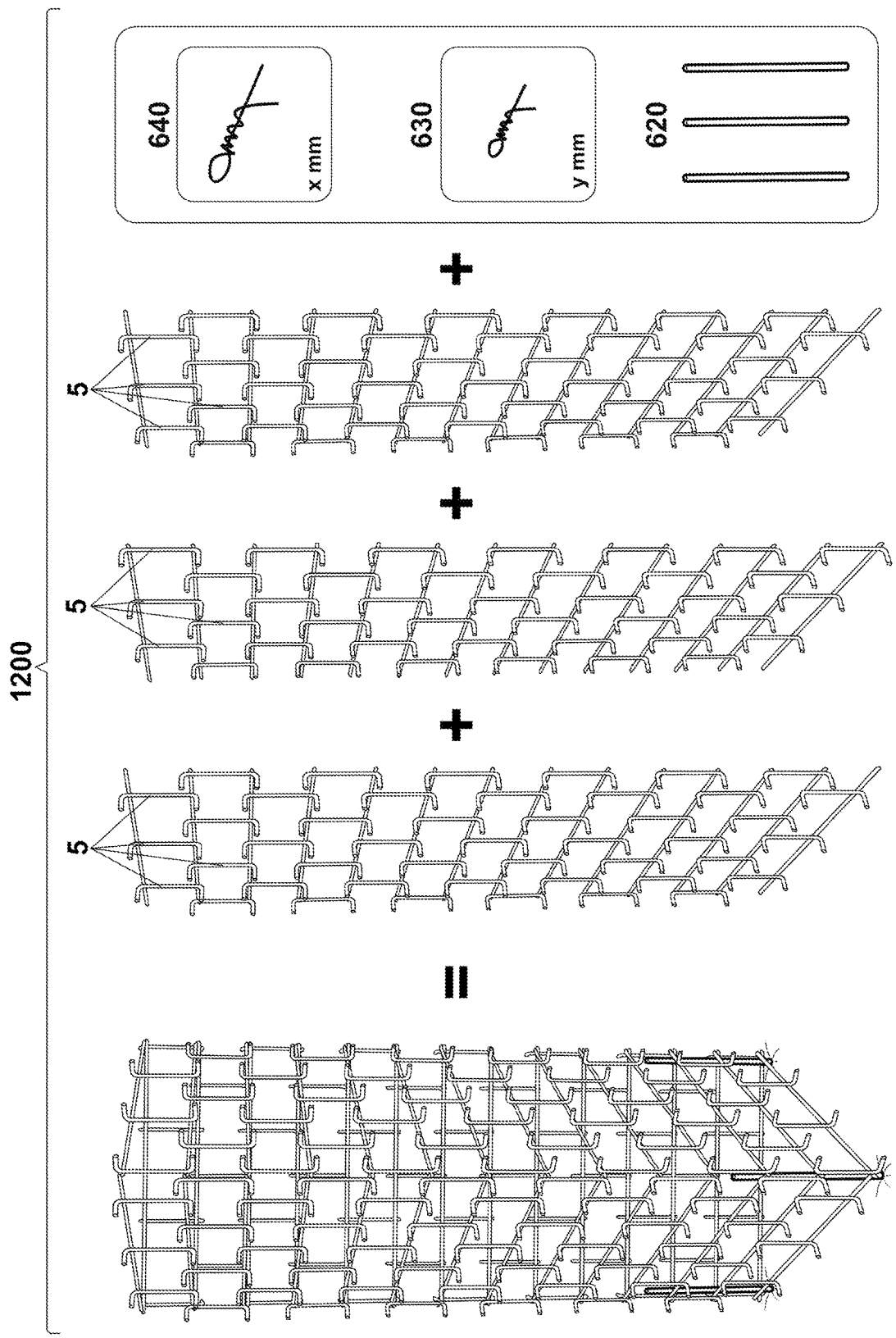
FIG. 12 shows a kit (1200) with the different pieces that integrate the protector according to a realization mode of the invention for a prismatic form with a triangular base (according to the embodiment depicted in FIGS. 6 and 7).

The successive union of a plurality of these multi-pronged elements (5) will give rise to a multi-dimensional structure similar to a mesh or grille from which the spikes protrude. FIG. 12 shows an example of this type of mesh or grids in a rectangular shape. In the example shown in FIG. 2 the multi-dimensional structure (formed by the union of multiple multi-pronged elements 5) is bent to join its two ends, thus forming a protector device with the shape of a cylinder. As we bend to one side or the other, the protruding spikes (3) will be in or out of the cylinder. In the case shown, which is the most common, the spikes protrude outwards.

Figure 3:
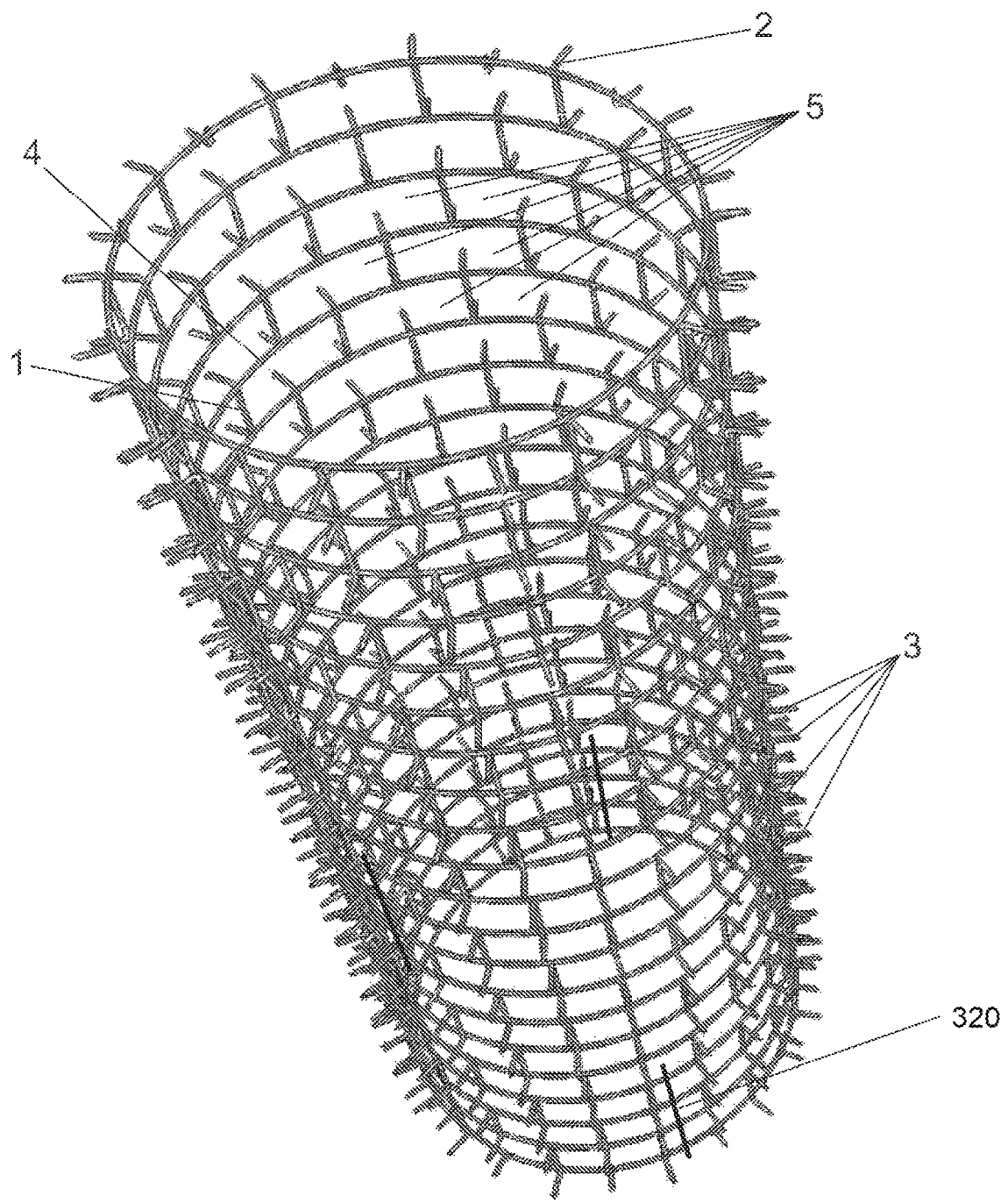
FIG. 3 shows a perspective view of the invention according to a first embodiment of the invention wherein the protector device has a shape of a cylinder.

Multi-pronged elements (5) may be of any size, height and width. In one exemplary embodiment shown in FIG. 3, the cylindrical protector device is formed by the union of a plurality of pairs of multi-pronged elements (5). These elements comprise a C-shaped element having a first straight section (1) 10 centimeters long and 2.8 millimeters thick, sharp at their ends and a combination of plastic and metal, but may be of any length, thickness and material. Subsequently bend the wire 90° (1) at their ends resulting in "elbows" (2) and a final spike (3) 2.5 cm in length at each end. Said preform binds to another connecting element (4) 7.5 centimeters long and 2.8 millimeters thick and pointy at one end which is folded at 90° forming an elbow (2) to form a final spike (3) 2.5 centimeters long. This is a combination of plastic and metal, but may also be any length, thickness and material. This assembly described forms a variety of unique multi-pronged elements (5), which together with other unique multi-pronged elements (5), both to the right and left, above or below, by a final spike (3) that share these various types peculiar multi-pronged elements (5), form the multi-dimensional structure subject of this invention. The binding of the various types of unique multi-pronged elements (5) is performed such that each end spike (3) is 5 cm from the following final spike (3), but may be any desired distance and forming a sort of L-shaped structure placed in any position, both right, left, and inverted rightward and leftward. The invention, which in this preferred case shown in FIG. 3, can be bent cylindrically shaped having a diameter of 38 centimeters and a height of 100 centimeters from the ground is thus configured. For the case of protecting land animals, plants or objects, it is can be fixated to the ground by supports or anchors (320) consisting of metal bars of 5 mm thick and 70 centimeters long, which are nailed to the floor about 50 cm, but may be any size, thickness and material and tied with tie wire to the structure of the invention, although it may be attached by any means.

Figure 4:
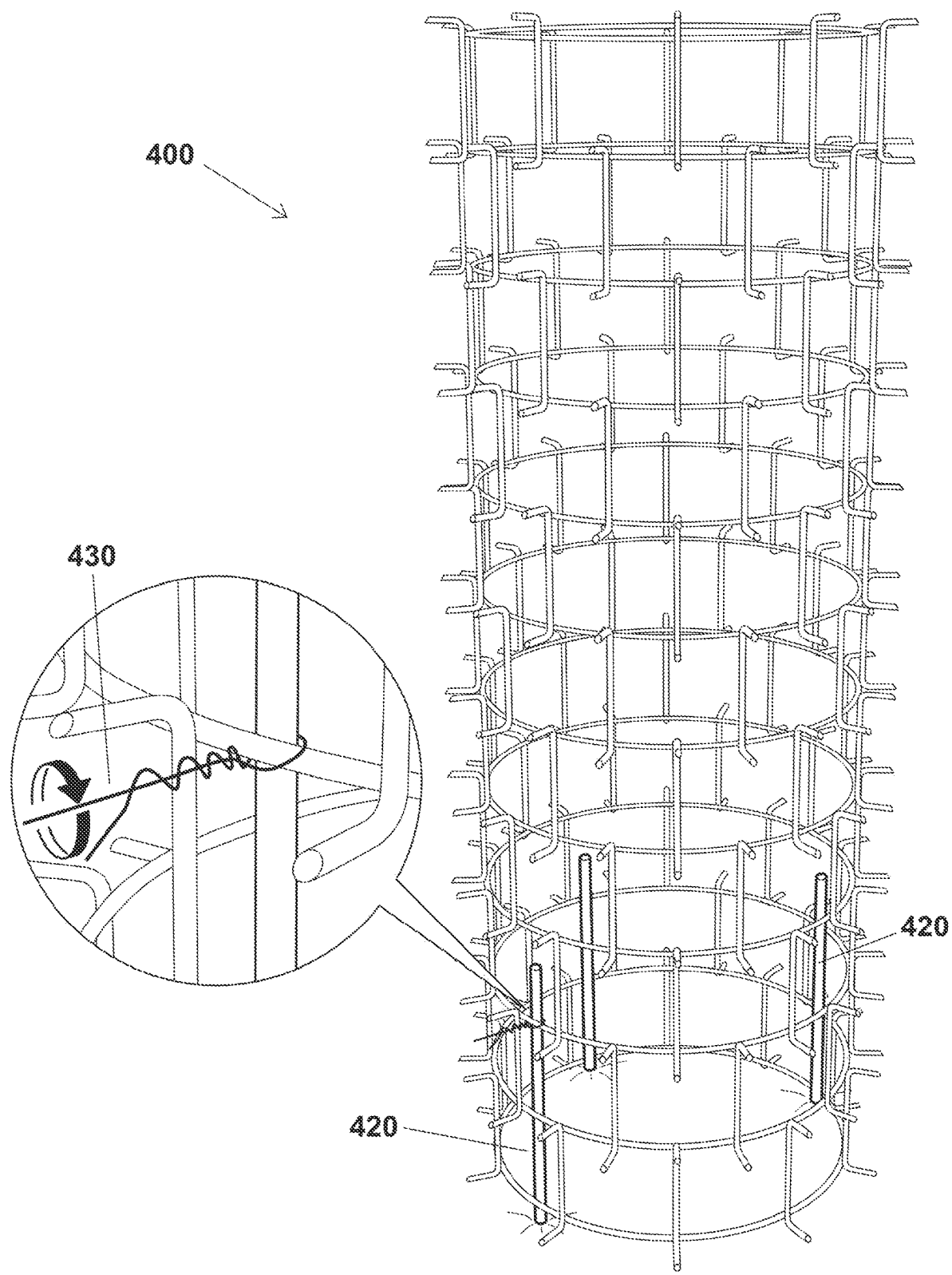
FIG. 4 shows a detailed view of the connection of the elements according to a first embodiment of the invention wherein the protector device has a shape of a cylinder.

FIG. 4 shows a protector device 400 disposed on a surface 405 of the ground. A plurality of anchors 420 are attached to the protector device 400 and extend to the surface 405. Anchors 420 are attached to the protector device 400 by wires 430.

Figure 5:
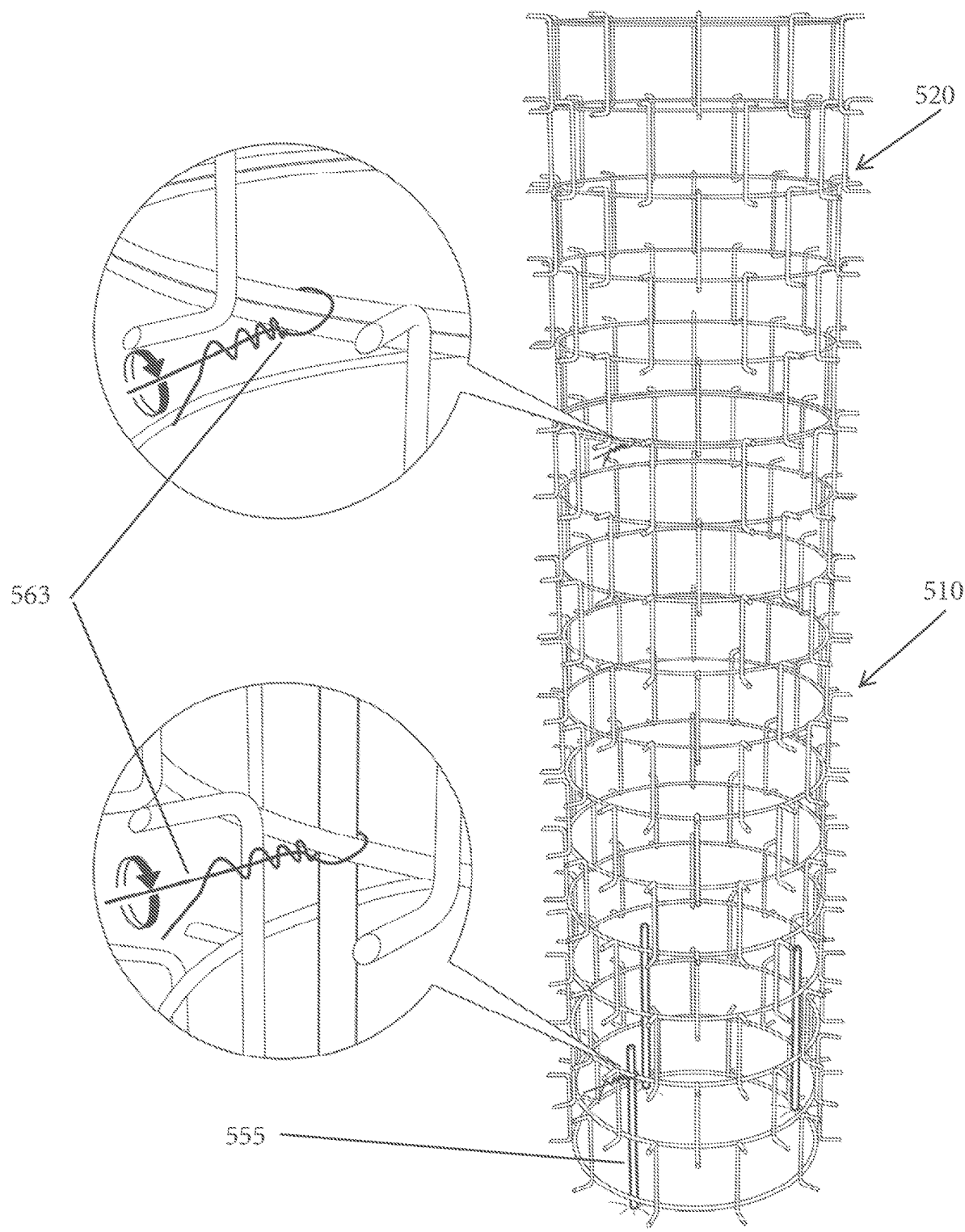
FIG. 5 shows a first cylindrical protector device and a second cylindrical protector device joined in a modular manner.

A first protector device 510 and a second protector device 520 are shown in FIG. 5 joined in a modular manner. A plurality of rods 555 are also used to add stability to the structure. A tie wire 563 is used to connect the two protector devices.

FIGS. 6-11 represent other embodiments with non-cylindrical configurations. In these embodiments the protector device has a prismatic shape with a polygonal base or section. The side walls of the protector device are obviously flat rather than curved (as in the cylinder) and each prism will have as many side walls as the base has (i.e. three for the triangle, four for the square, five for the pentagon, etc.).

Each side wall is formed by the union of a plurality of multi-pronged elements (5) that give rise to a flat module or multi-dimensional structure similar to a mesh or grille from which the spikes (3) protrude.

The dimensions of each side wall are variable in length and height, and can be set for each embodiment as a tailored design. This can be achieved in different ways, the following two being examples:
a) adding from a first pair of multi-pronged elements further similar pairs until a side wall of the desired dimensions is achieved, or
b) manufacturing with a plurality of pairs of multi-pronged elements a flat module or multi-dimensional structure similar to a mesh or grille of large dimensions, which is then cut into several pieces (side walls) of the desired size.

Figure 6:
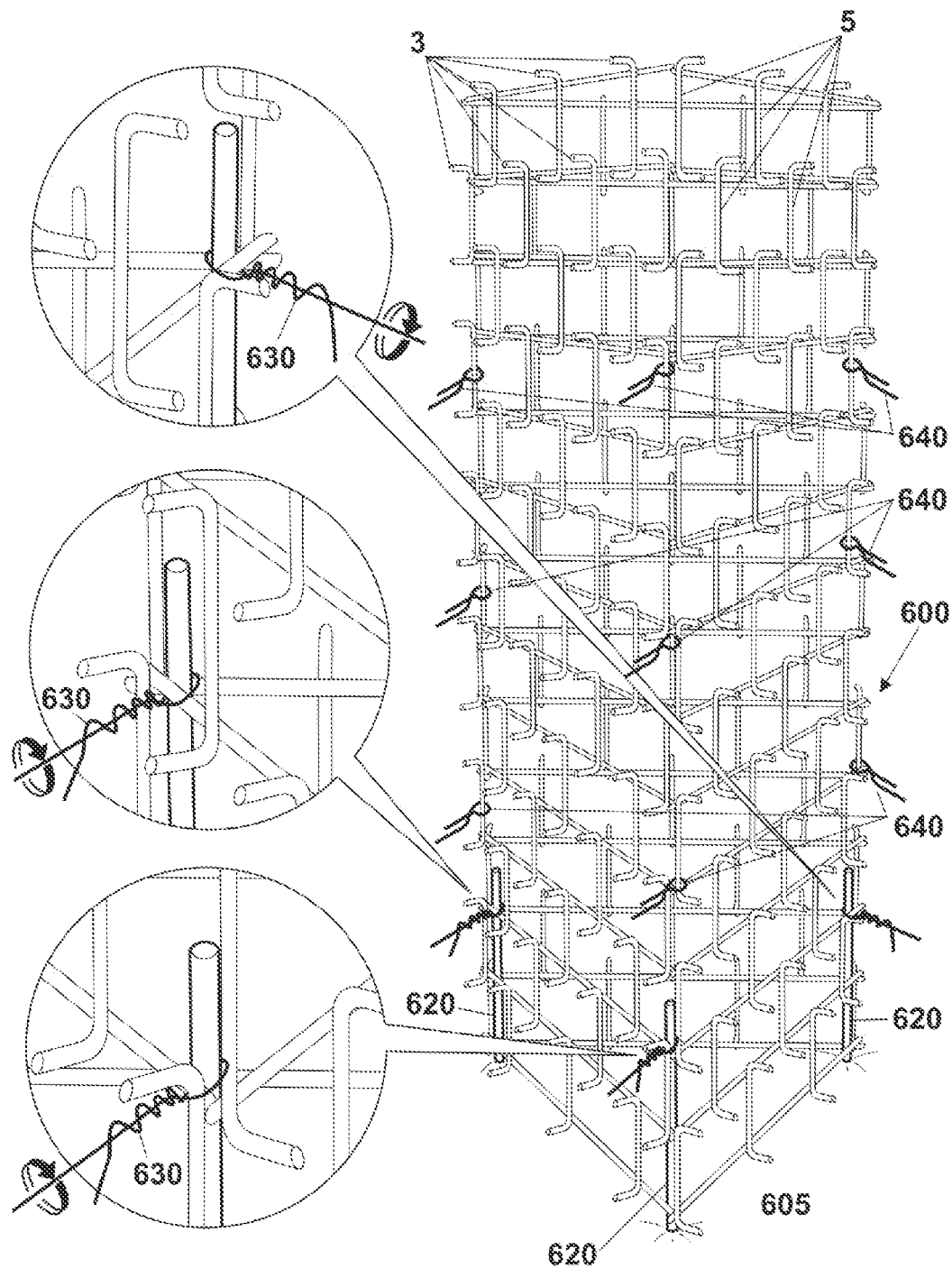
FIG. 6 shows a protector device according to a second embodiment of the invention wherein the protector has a prismatic shape with a triangular base
Figure 7:
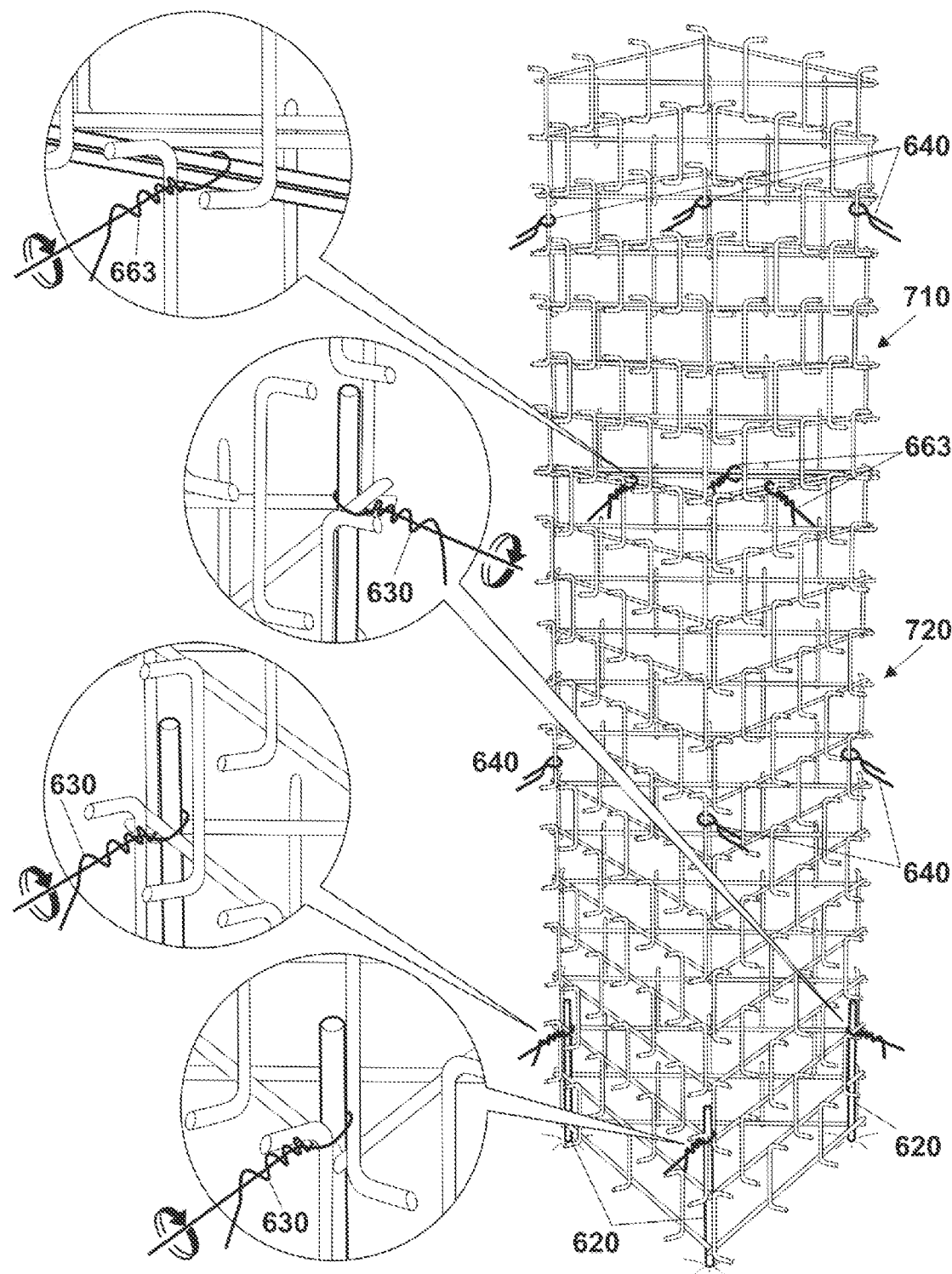
FIG. 7 shows another detailed view of the protector device according to a second embodiment of the invention wherein the protector has a prismatic shape with a triangular base

FIGS. 6 and 7 show a protector device according to a second embodiment of the invention wherein the protector has a prismatic shape with a triangular base.

FIG. 6 shows a protector device 600 disposed on a surface of the ground 605. The protector device has a prismatic shape with a triangular section or base with three side walls. Each side wall is formed by the union of a plurality of multi-pronged elements 5 that give rise to a multi-dimensional structure similar to a mesh or grille from which the spikes 3 protrude. A plurality of anchors or rods 620 are attached to the protector device 600 and extend to the surface 605. Anchors 620 are attached to the protector device 600 by wires 630. The three side walls are connected to each other by means of a plurality of clamps or wires 640.

A first protector device 710 and a second protector device 720 are shown in FIG. 7 joined in a modular manner. Both protector devices have a prismatic shape with a triangular base with three side walls. A plurality of anchors or rods 620 are also used to add stability to the structure.

Anchors 620 are attached to the second protector device 720 by wires 630 A plurality of tie wires 663 are used to connect the two protector devices. The three side walls are connected to each other by means of a plurality of clamps or wires 640.

Figure 8:
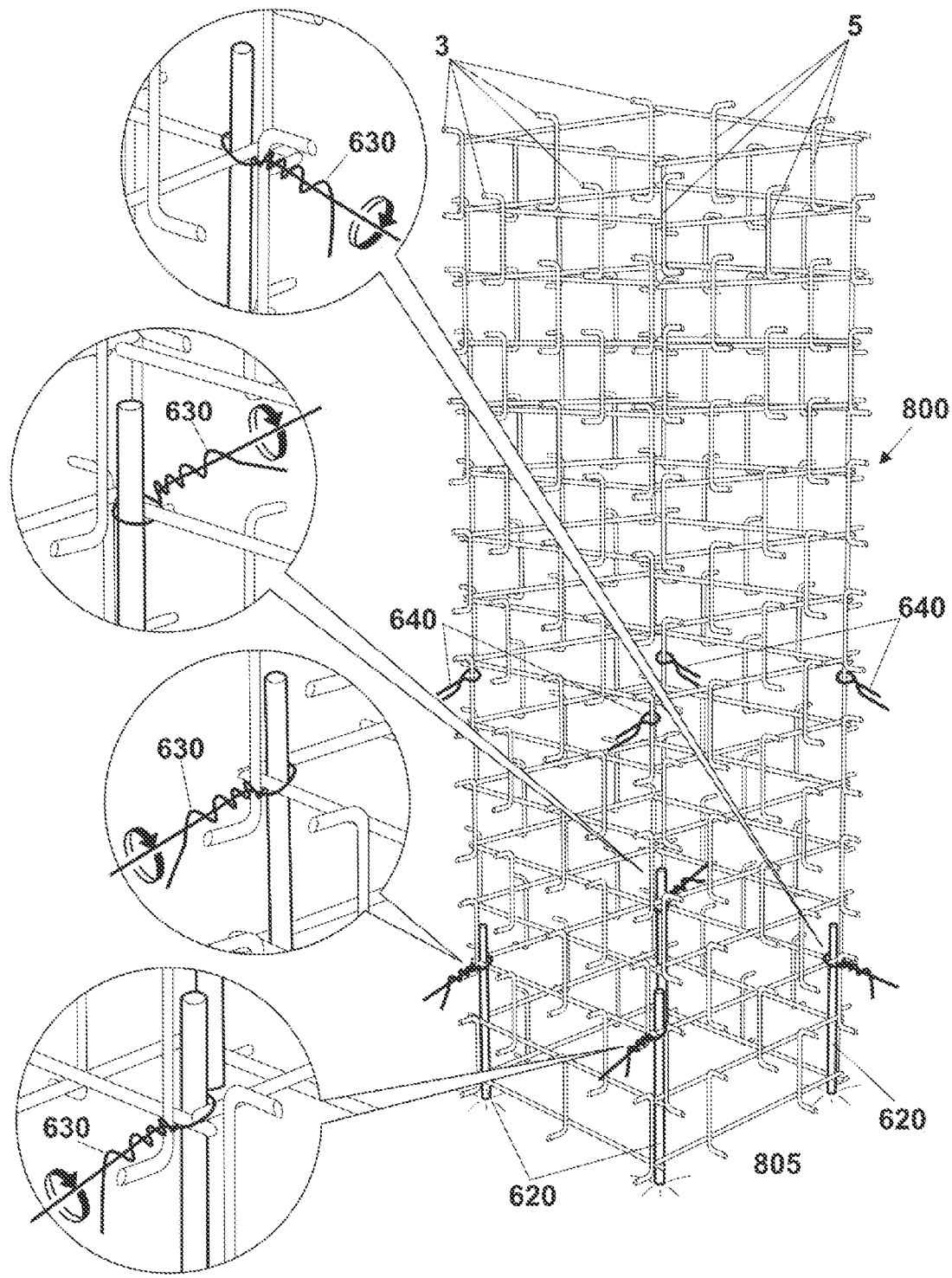
FIG. 8 shows a protector device according to a third embodiment of the invention wherein the protector has a prismatic shape with a with a square or rectangular base.
Figure 9:
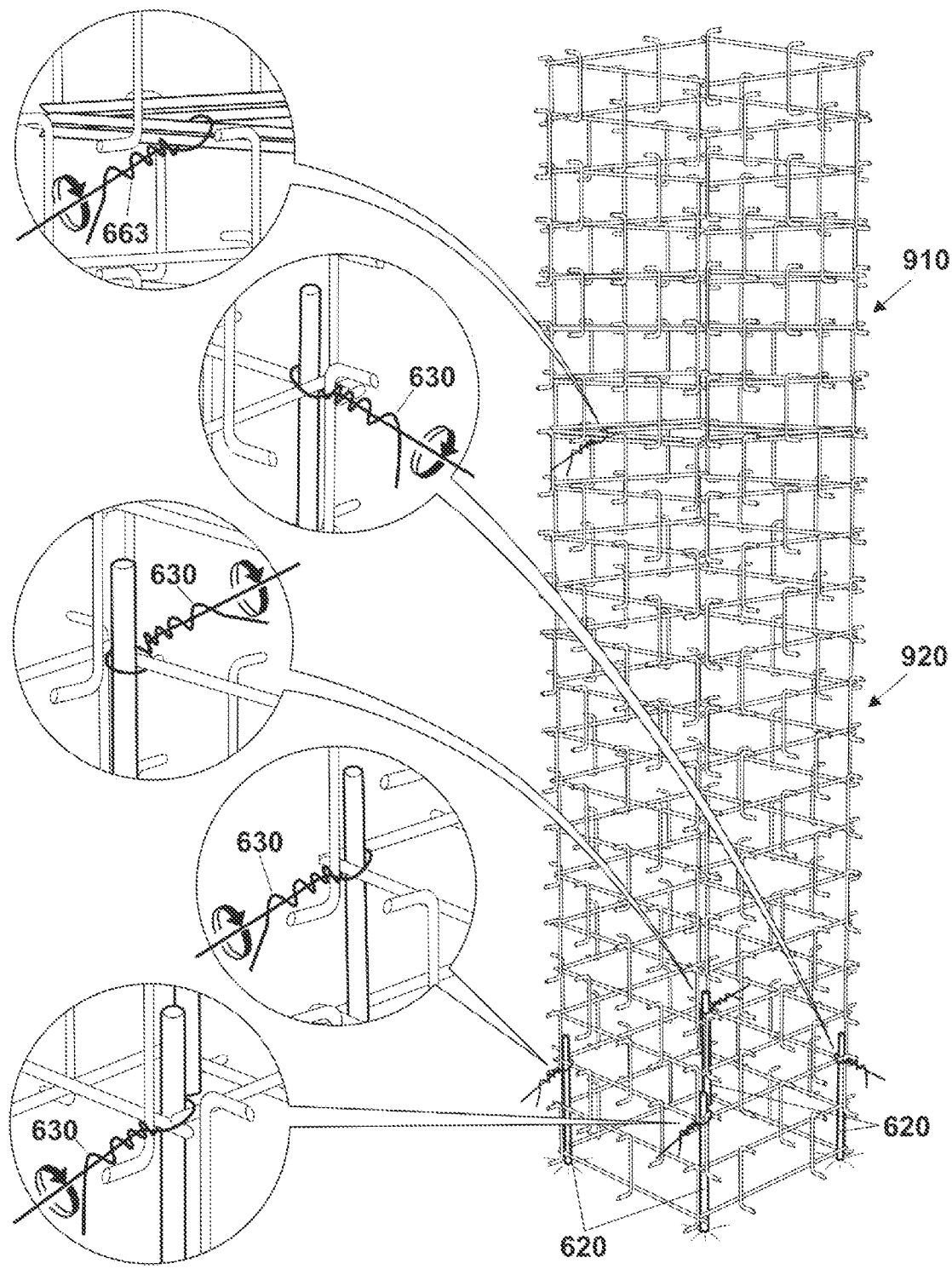
FIG. 9 shows another detailed view of the protector device according to a third embodiment of the invention wherein the protector has a prismatic shape with a square or rectangular base.

FIGS. 8 and 9 show a protector device according to a third embodiment of the invention wherein the protector has a prismatic shape with a with a square or rectangular section or base. FIG. 8 shows a protector device 800 disposed on a surface of the ground 805. The protector device has a prismatic shape with a tetragonal section or base with four side walls. If the four sides of the base are equal we will have a square base, if the sides are equal two by two, then it will be a rectangle and if the sides are different, then it will be an irregular four-sided polygon. In the specific case shown in FIG. 8 it is a square. Each side wall is formed by the union of a plurality of multi-pronged elements 5 that give rise to a multi-dimensional structure similar to a mesh or grille from which the spikes 3 protrude. A plurality of anchors or rods 620 are attached to the protector device 800 and extend to the surface 805. Anchors or rods 620 are attached to the protector device 800 by wires 630. The four side walls are connected to each other by means of a plurality of clamps or wires 640

A first protector device 910 and a second protector device 920 are shown in FIG. 9 joined in a modular manner. Both protector devices have a prismatic shape with a squared base with four side walls. A plurality of anchors or rods 620 are also used to add stability to the structure. A plurality of tie wires 663 are used to connect the two protector devices. The four side walls are connected to each other by means of a plurality of clamps or wires 640 (not shown).

Figure 10:
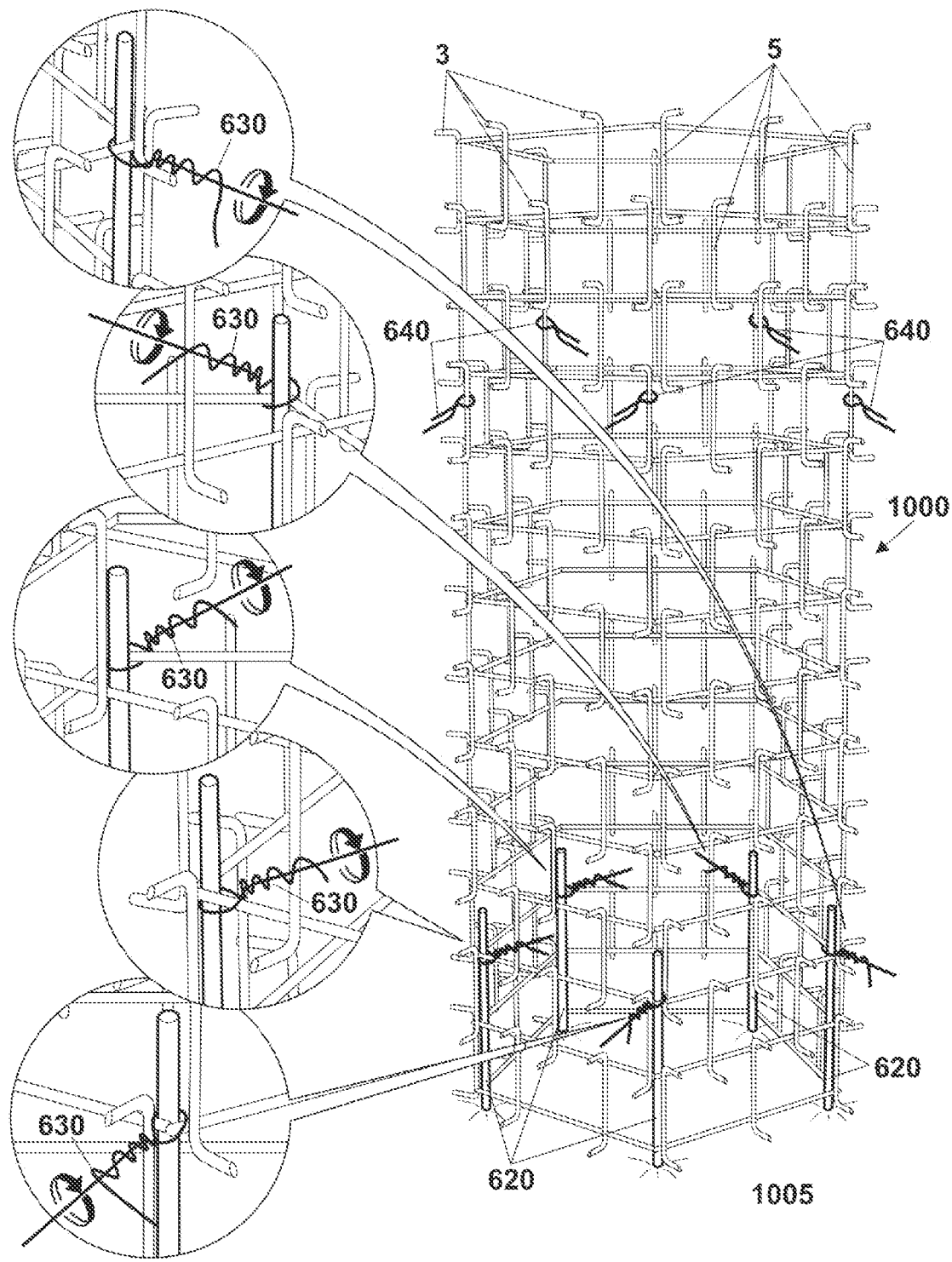
FIG. 10 shows a protector device according to a fourth embodiment of the invention wherein the protector has a prismatic shape with a polygonal base (in this case a pentagon).
Figure 11:
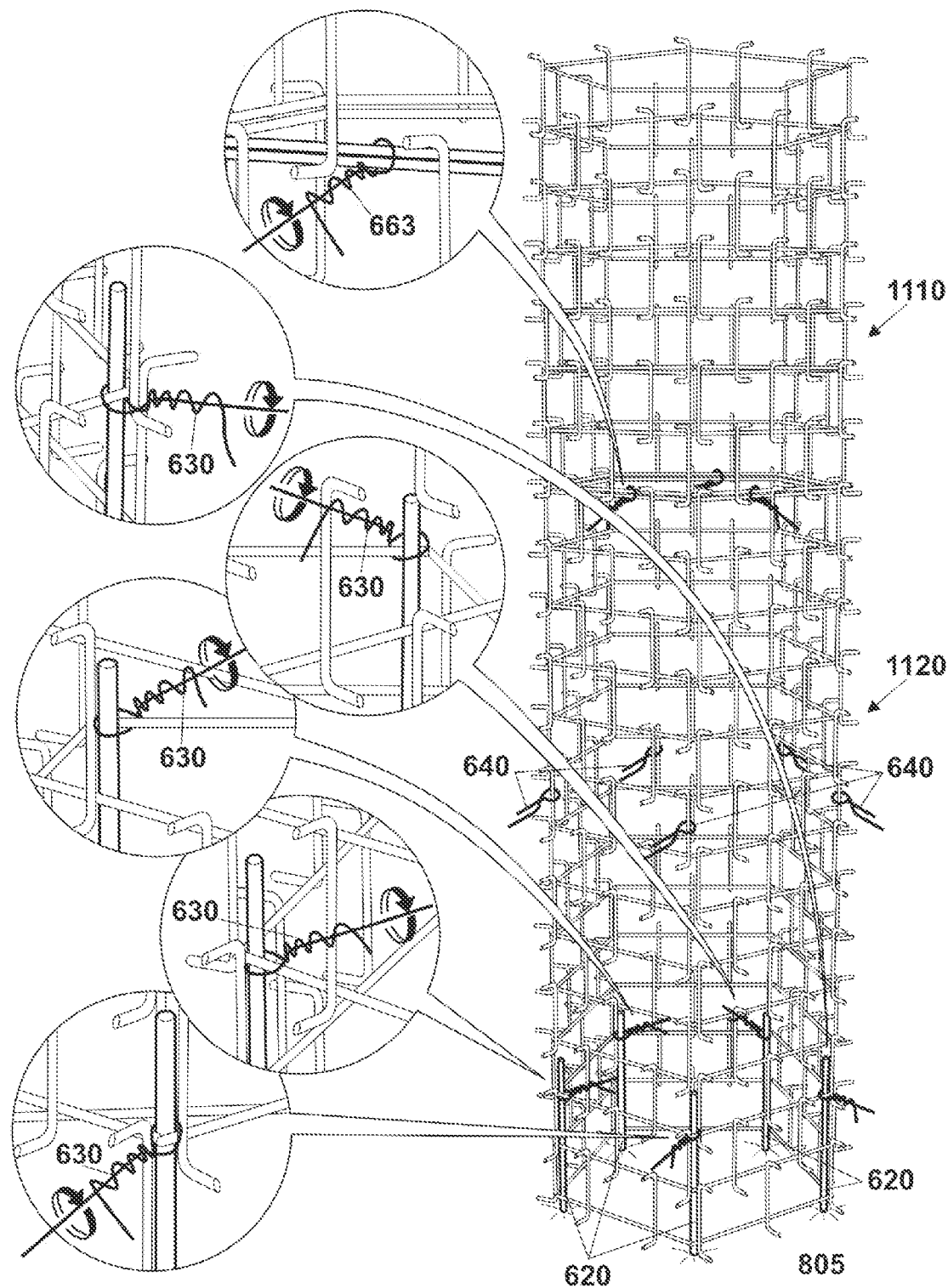
FIG. 11 shows another detailed view of the protector device according to a fourth embodiment of the invention wherein the protector has a prismatic shape with a polygonal base (in this case a pentagon).

FIGS. 10 and 11 show a protector device according to a fourth embodiment of the invention wherein the protector has a prismatic shape with a polygonal section or base (in this case a pentagon).

FIG. 10 shows a protector device 1000 disposed on a surface of the ground 1005. The protector device has a prismatic shape with a pentagonal section or base with five side walls. Each side wall is formed by the union of a plurality of multi-pronged elements 5 that give rise to a multi-dimensional structure similar to a mesh or grille from which the spikes 3 protrude. A plurality of anchors or rods 620 are attached to the protector device 1000 and extend to the surface 1005. Anchors or rods 620 are attached to the protector device 1000 by wires 630. The five side walls are connected to each other by means of a plurality of clamps or wires 640.

A first protector device 1110 and a second protector device 1120 are shown in FIG. 11 joined in a modular manner. Both protector devices have a prismatic shape with a pentagonal base with five side walls. A plurality of anchors or rods 620 are also used to add stability to the structure. A plurality of wires 663 is used to connect the two protector devices. The five side walls are connected to each other by means of a plurality of clamps or wires 640.

In these prismatic configurations, the anchors or rods 620 are located at the vertices of the polygonal base, in such a way that there are as many rods as there are vertices.

Polygonal embodiments with 5 or more vertices (i.e. pentagonal, hexagonal, etc.) can be formed by independent side walls attached to each other (as in the attached pentagonal example depicted in FIG. 10 or 11), although they could also be manufactured from one single piece (as in the cylindrical embodiment), simply by bending the piece in as many corners as desired. In other words, instead of making a constant bend until reaching a cylinder, to go bending every X cm and generating in this way as many vertices of a polygonal as desired.

The previous drawings show that in the new non-circular embodiments, there is no longer one single piece rolled up on itself in order to form the protective cylinder, but in this case, what is done, is to provide as many flat, cut out pieces as side walls.

FIG. 12 shows an example of a Kit which also forms part of the present invention. The example shown in FIG. 12 is a protector device of triangular section (according to the embodiment depicted in FIGS. 6 and 7), and therefore there are three pieces of mesh type (for the three side walls). The protector devices which are the object of the invention can therefore be supplied as a kit with the necessary parts for the user to build the protector device himself.

In the example shown in FIG. 12, as corresponds to a triangular base protector device, three modules or three cut multi-dimensional flat pieces are supplied. In addition, an X number of clamps or wires 640 are supplied to join the three pieces (side walls) together and another Y number of clamps or wires 630 are supplied to join the side walls to the anchors or rods 620. Also, as many anchors or rods 620 are supplied as there are vertices in the polygon that configures the base (in this example, since it is a triangle, three anchors or rods 620 are supplied).

The technical expert will understand that obviously the kit will incorporate as many side walls as necessary to configure the desired prism (i.e. for a quadrilateral section will be four side walls, for a pentagonal five, etc.). In the particular case of a cylindrical protector device, a single piece of mesh type will be incorporated which will then be bent to form the wall of the cylinder. Likewise the number of anchors or rods 620 will coincide with the number of vertices of the polygon. In the particular case of a cylindrical protector device there will be at least three. And the number of clamps or wires 630 and 640 will depend on the type and dimensions of the protector device and the number of side walls.

Figure 13:
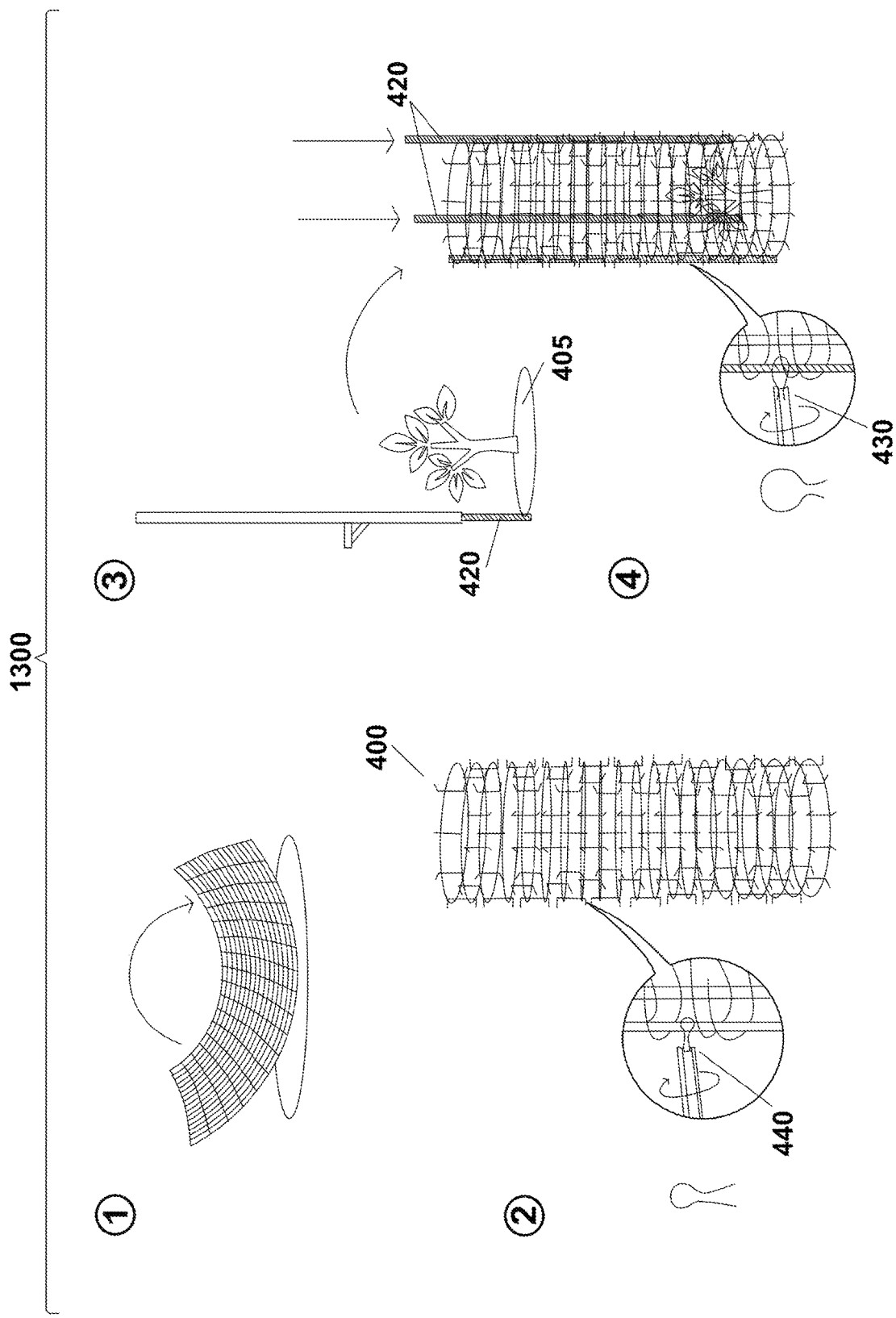
FIG. 13 shows in a schematic way the assembly procedure (1300) of the protector device object of the invention from a kit. The example shown corresponds to a cylindrical protector device (according to the embodiment depicted in FIGS. 3 and 4).

It is also part of the present invention the method of assembling the protective device from a Kit as described above. FIG. 13 shows in a schematic way the assembly procedure of the protector device object of the invention from a kit. The example shown corresponds to a cylindrical protector device (according to the embodiment depicted in FIGS. 3 and 4). In this example, the graphically specified assembly steps would be as follows:
1. Bend the module or the multi-dimensional flat piece of mesh type to obtain a cylinder of the desired radius.
2. Attach a plurality of multi-pronged elements 5 to each other in the position set in step 1. The clamps or wires 440 supplied in the kit should be used for tying.
3. Partially drive or nail the anchors or rods 420 into the ground. Preferably the anchors or rods should be driven into the outside of the protector device. This could be done by simply hitting their top end with a hammer, but an auxiliary element such as the one shown in FIG. 13 can also be used for this driving task. This auxiliary element is provided with a horizontal surface halfway up the element, which serves to hit the same more easily with a mallet or hammer due to its greater surface area.
4. The protector device configured in step 2 is placed adjacent to the driven anchors or rods and is then attached to the anchors or rods 420. The clamps or wires 430 supplied in the Kit will be used for tying.

If the configuration is not cylindrical, i.e. one of the configurations shown in FIGS. 6 to 12 for polygonal-based prismatic protector devices, the steps of the method would be as follows:
1. The different modules or multi-dimensional flat pieces of mesh type are placed according to the desired prismatic configuration.
2. These modules or flat pieces are attached to each other in the position set in step 1. The clamps or wires 440 supplied in the kit should be used for tying.
3. Partially drive or nail the anchors or rods 420 into the ground. Preferably the anchors or rods should be driven into the outside of the protector device. An auxiliary element such as the one shown in FIG. 13 can be used for the driving task.
4. The protector device configured in step 2 is placed adjacent to the driven anchors or rods and is then attached to the anchors or rods 420. The clamps or wires 430 supplied in the Kit will be used for tying.

The kit shown in FIG. 12 are called triangular because it carries the pieces in order to form that polygon; however, the end user could buy 2 triangular kits and make a hexagon, from which it follows that the pieces could be combined in order to form any shape.

With regard to the system of the wires/tying clamps, any wire currently marketed and, in fact, any tying system can be used, e.g. flanges, duct tape, string, etc.

With regard to the bars/anchors, normal corrugated bars can be used (like the ones used in the works for reinforced concrete) or rods without corrugation would also be valid. In fact, any type of rods can be used. The bars/anchors can even have another shape, L-angles instead of rods may be used, or wooden stakes, or any other shape existing in the market.

The only requirement is that the piece is sufficiently rigid in order to keep the protective metallic meshes or modules (side walls) upright.

The anchor rods can be placed outside or inside of the side walls (although it is more common to place them outside). The end user can decide which option he likes the best.

On the other hand, the bars/anchors are to anchor the protectors to the ground and can be as the customers wants, sticking out of the protector or not. In the exemplary drawings attached, it is shown that the rods are anchored in the ground and protrude by approx. 30 cm. The protruding length is completely variable. The bars will simply have to sink deep enough into the ground so that they are securely fastened, and then it is really irrelevant how much they protrude from the ground. It will depend on the length of the anchors/rods being used. Moreover, the rods are ultimately something optional. It could be perfectly renounced to them as the simple joining of three or four modules or meshed pieces to form a prism or a cylinder itself, is already vertically self-supporting. The bars are to "reinforce" the stability of the prism or cylinder and prevent it from tipping over due to a bump by an animal.

Regarding the assembly system, the end user is left with the creativity to do what he is interested in, such as e.g. assembling several protectors in height and width, or to do it by forming the shapes he wants. The possible combinations are endless. You can for example join horizontally two modules intended for a cylindrical configuration. In this way we can create a large diameter cylinder. But if we join those two modules vertically, what we get is a cylinder with a smaller diameter but more height. Similarly, with polygonal configurations, any polygon can be obtained, with the desired shape and height, simply by joining modules together, horizontally or vertically. It is therefore a "modular" assembly.

The invention claimed is:

1. A side wall for a protector device comprising:
a plurality of pairs of multi-pronged elements, each pair of multi-pronged elements comprising:
  a first multi-pronged element comprising:
    a first C-shaped element having a first straight section, a first end bent to form a first elbow and a first end spike, and a second end bent to form a second elbow and a second end spike, the first end spike projecting perpendicular to the first straight section, the second end spike projecting perpendicular to the first straight section, wherein the first straight section, the first end spike, and the second end spike form a C-shape; and
    a first connecting element attached to the first C-shaped element, the first connecting element being perpendicular to the first straight section, wherein the first straight section and the first connecting element form an L-shape; and
  a second multi-pronged element attached to the first connecting element and not attached to the first C-shaped element, the second multi-pronged element comprising:
    a second C-shaped element connected to the first connecting element of the first multi-pronged element, the second C-shape element having a second straight section, a third end bent to form a third elbow and a third end spike, and a fourth end bent to form a fourth elbow and a fourth end spike, the third end spike projecting perpendicular to the second straight section, the fourth end spike projecting perpendicular to the second straight section, wherein the second straight section, the third end spike, and the fourth end spike form a C-shape; and
    a second connecting element attached to the second C-shaped element and not attached to the first C-shaped element, the second connecting element being perpendicular to the second straight section, wherein the second straight section and the second connecting element form an L-shape;
wherein the side wall is configured as a flat module or multi-dimensional structure from which the end spikes protrude.

2. A protector device comprising:
three or more side walls according to claim 1,
wherein the side walls are attached to each other to form a prism having a first end, and a second end,
wherein the first end of the protector device is disposed on a horizontal surface.

3. The protector device according to claim 2, wherein the end spikes (3) project axially away from a central axis of the prism and perpendicular to the side walls of the prism and are disposed in a position parallel to the horizontal surface.

4. The protector device according to claim 2, wherein the prism is a triangular prism and a number of side walls is three.

5. The protector device according to claim 2, wherein prism is a square prism or a rectangular prism and a number of side walls is four.

6. The protector device according to claim 2, wherein the prism is a pentagonal prism and a number of side walls is five.

7. The protector device according to claim 2, wherein the three or more side walls forming the prism are connected to each other by means of a plurality of tying means.

8. The protector device according to claim 2, wherein the protector device is disposed on a surface of a ground, and is secured to the ground with one or more rods extending to the surface and attached to the protector device by means of a plurality of tying means.

9. The protector device according to claim 8, wherein the one or more rods are located at vertices of the prism.

10. The protector device according to claim 2, wherein the first and second end spikes of each of the three or more side walls have a selected level of sharpness.

11. The protector device according to claim 2, wherein the protector device is disposed around one of plants, bushes, trees, objects or surfaces, without any clamping or tying.

12. The protector device according to claim 2, wherein the protector device is connected to a second protector device having a same or different construction to the protector device.

13. A kit for the assembly of a protector device comprising:
a plurality of side walls according to claim 1 to configure a desired prism or cylinder;
a plurality of tying means to join the side walls;
a plurality of rods; and
a plurality of tying means to join the side walls to the rods.

14. A method of assembling a cylindrical protective device comprising a side wall according to claim 1, the method comprising the following steps:
a) bending the side wall to obtain a cylinder of desired radius wherein the
plurality of multi-pronged elements are attached to each other by means of a plurality of tying means such that a cylindrical protective device is formed;

b) partially driving or nailing the anchors or rods into a ground; and c) placing the cylindrical protective device configured in step a) adjacent to the rods and thereafter attaching the cylindrical protective device to the rods by means of a plurality of tying means.

15. A method of assembling a polygonal-based prismatic protective device comprising a plurality of side walls according to claim 1, the method comprising the following steps:

a) arranging the plurality of side walls to obtain a polygonal-based prismatic shape;

b) attaching the plurality of side walls by means of a plurality of tying means;

c) partially driving or nailing rods into a ground; and d) placing the polygonal-based prismatic protector device configured in step b) adjacent to the rods and then attaching to the rods by means of the plurality of tying means.

* * * * *